(12) United States Patent
Maletsky et al.

(10) Patent No.: US 9,323,950 B2
(45) Date of Patent: Apr. 26, 2016

(54) GENERATING SIGNATURES USING A SECURE DEVICE

(75) Inventors: Kerry Maletsky, Monument, CO (US); David Durant, Colorado Springs, CO (US); Balaji Badam, Colorado Springs, CO (US); Michael Seymour, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/553,388

(22) Filed: Jul. 19, 2012

(65) Prior Publication Data

US 2014/0025944 A1    Jan. 23, 2014

(51) Int. Cl.
| | |
|---|---|
| *G06F 21/64* | (2013.01) |
| *G06F 21/57* | (2013.01) |
| *G06F 21/72* | (2013.01) |
| *H04L 9/32* | (2006.01) |
| *H04L 29/06* | (2006.01) |
| *H04L 9/08* | (2006.01) |

(52) U.S. Cl.
CPC ............... *G06F 21/64* (2013.01); *G06F 21/57* (2013.01); *G06F 21/72* (2013.01); *H04L 9/3247* (2013.01); *H04L 9/3271* (2013.01); *H04L 9/0877* (2013.01); *H04L 9/3268* (2013.01); *H04L 63/0823* (2013.01)

(58) Field of Classification Search
CPC . H04L 63/0823; H04L 9/0877; H04L 9/3247; H04L 9/3263
USPC ......................................................... 713/150
See application file for complete search history.

(56) References Cited

U.S. PATENT DOCUMENTS

| | | | |
|---|---|---|---|
| 6,212,635 B1 * | 4/2001 | Reardon ................. | G06F 21/34 380/30 |
| 6,601,172 B1 | 7/2003 | Epstein | |
| 6,704,871 B1 | 3/2004 | Kaplan et al. | |
| 6,708,273 B1 | 3/2004 | Ober et al. | |
| 6,826,690 B1 | 11/2004 | Hind | |
| 6,961,858 B2 * | 11/2005 | Fransdonk .............. | G06F 21/10 380/281 |
| 6,996,710 B1 * | 2/2006 | Ellison .................. | H04L 9/0861 713/156 |
| 7,142,674 B2 * | 11/2006 | Brickell .................. | G06F 21/85 380/285 |
| 7,165,181 B2 * | 1/2007 | Brickell ................ | H04L 9/3271 713/168 |

(Continued)

OTHER PUBLICATIONS

How Certificates Work; Updated Mar. 28, 2003; retrieved https://technet.microsoft.com/en-us/library/Cc776447(v=WS.10).aspx on Jul. 17, 2015.*

(Continued)

*Primary Examiner* — James Turchen
(74) *Attorney, Agent, or Firm* — Fish & Richardson P.C.

(57) ABSTRACT

An integrated circuit device comprises a processor and a secure protection zone with security properties that can be verified by a remote device communicating with the integrated circuit device. The secure protection zone includes a persistent storage that is configured for storing cryptographic keys and data. The secure protection zone also includes instructions that are configured for causing the processor to perform cryptographic operations using the cryptographic keys. In addition, the secure protection zone includes an ephemeral memory that is configured for storing information associated with the cryptographic operations. The instructions are configured for causing the processor to perform the cryptographic operations on the data stored in the persistent storage and the information in the ephemeral memory as part of a secure communication exchange with the remote device.

27 Claims, 5 Drawing Sheets

(56) References Cited

U.S. PATENT DOCUMENTS

| | | | |
|---|---|---|---|
| 7,213,149 B2* | 5/2007 | Mache | H04L 63/0442 380/259 |
| 7,369,856 B2* | 5/2008 | Ovadia | H04L 41/0213 455/437 |
| 7,430,668 B1* | 9/2008 | Chen | G06F 11/2289 713/1 |
| 7,584,359 B2* | 9/2009 | Karaoguz | H04L 63/083 713/173 |
| 7,685,263 B2* | 3/2010 | Redjaian | G06F 21/57 380/255 |
| 7,716,497 B1 | 5/2010 | Trimberger | |
| 7,822,204 B2 | 10/2010 | Yoshida et al. | |
| 8,165,301 B1* | 4/2012 | Bruce | G06F 21/82 380/277 |
| 8,321,680 B2 | 11/2012 | Gantman et al. | |
| 8,555,072 B2* | 10/2013 | Camenisch | G06F 21/445 380/30 |
| 2002/0026578 A1 | 2/2002 | Hamann et al. | |
| 2003/0046542 A1 | 3/2003 | Chen et al. | |
| 2003/0093663 A1 | 5/2003 | Walker | |
| 2003/0138105 A1 | 7/2003 | Challener et al. | |
| 2004/0101141 A1 | 5/2004 | Alve | |
| 2005/0005097 A1* | 1/2005 | Murakawa | H04L 63/0442 713/156 |
| 2006/0098824 A1 | 5/2006 | Mao | |
| 2006/0122937 A1 | 6/2006 | Gatto et al. | |
| 2006/0218649 A1 | 9/2006 | Brickell et al. | |
| 2006/0282901 A1 | 12/2006 | Li et al. | |
| 2007/0119918 A1 | 5/2007 | Hogg et al. | |
| 2007/0237366 A1 | 10/2007 | Maletsky | |
| 2008/0263357 A1 | 10/2008 | Boyen | |
| 2008/0287757 A1* | 11/2008 | Berson | A61B 5/14551 600/324 |
| 2009/0031141 A1* | 1/2009 | Pearson | G06F 21/10 713/187 |
| 2009/0129600 A1 | 5/2009 | Brickell et al. | |
| 2009/0144541 A1* | 6/2009 | Kim | H04L 63/0869 713/156 |
| 2010/0005318 A1* | 1/2010 | Hosain | H04L 9/088 713/193 |
| 2010/0082984 A1* | 4/2010 | Ellison | G06F 21/57 713/170 |
| 2010/0082987 A1* | 4/2010 | Thom | G06F 21/34 713/171 |
| 2010/0088523 A1* | 4/2010 | Wooten | G06F 21/57 713/189 |
| 2010/0185864 A1* | 7/2010 | Gerdes, Jr. | H04L 9/3213 713/175 |
| 2010/0203960 A1 | 8/2010 | Wilson et al. | |
| 2011/0099362 A1 | 4/2011 | Haga et al. | |
| 2011/0219427 A1 | 9/2011 | Hito et al. | |
| 2011/0221568 A1 | 9/2011 | Giobbi | |
| 2011/0271099 A1* | 11/2011 | Preiss | H04L 63/0807 713/155 |
| 2012/0023568 A1* | 1/2012 | Cha | G06F 21/335 726/10 |
| 2013/0046547 A1 | 2/2013 | Drucker et al. | |
| 2013/0145151 A1* | 6/2013 | Brown | H04L 9/3268 713/156 |
| 2013/0276074 A1 | 10/2013 | Orsini et al. | |
| 2014/0068246 A1 | 3/2014 | Hartley et al. | |
| 2014/0089670 A1 | 3/2014 | Maletsky et al. | |
| 2014/0281554 A1 | 9/2014 | Maletsky et al. | |

OTHER PUBLICATIONS

Authentication in Distributed Systems: Theory and Practice; Butler Lampson et al.; ACM; Trans. Computer Systems 10, 4 (Nov. 1992), pp. 265-310.*
VIPER: Verifying the Integrity of PERipherals' Firmware; Yanlin Li et al.; ACM; CCS'11, Oct. 17-21, 2011.*
Edman, Matthew, 'Cryptographic Security in Wireless Networks Via Physical Layer Properties,' Doctoral Dissertation, Rensselaer Polytechnic Institute, May 2011, 141 pages.
USPTO Non-final Office Action in U.S. Appl. No. 13/628,946, mailed Nov. 27, 2013, 13 pages.
Boneh, D., Boyen, X., and Shacham, H., "Short Group Signatures", Advances in Cryptology, CRYPTO 2004, Springer-Verlag, pp. 1-19.
Johnson, D., Menezes, A., and Vanstone, S., "The Elliptic Curve Digital Signature Algorithm (ECDSA)", Jul. 27, 2001, Springer-Verlag 2001, pp. 36-63.
Final OA for U.S. Appl. No. 13/800,422 mailed Jan. 27, 2015, 25 pages.
USPTO Final Office Action in U.S. Appl. No. 13/628,946, mailed Jun. 25, 2015, 15 pages.
USPTO Notice of Allowance in U.S. Appl. No. 13/800,422, mailed Apr. 24, 2015, 19 pages.
U.S. Appl. No. 13/800,422, filed Mar. 13, 2013, 53 pages.
Final office action for U.S. Appl. No. 13/628,946, mailed Jun. 6, 2014, 15 pages.
Non-Final office action for U.S. Appl. No. 13/628,946 mailed Dec. 4, 2014, 15 pages.
Non-Final Office Action for U.S. Appl. No. 13/800,422 mailed Oct. 7, 2014, 25 pages.

* cited by examiner

GENERATING SIGNATURES USING A SECURE DEVICE

TECHNICAL FIELD

This disclosure relates generally to secure storage of data and keys and associated signatures.

BACKGROUND

In some systems, devices connected to one another may be configured to work correctly under certain circumstances. Such information may be embedded in the devices. For correct operation, a device, such as a host, may want to verify that the information being provided by a connected client device, such as a peripheral component, is accurate.

SUMMARY

In one general aspect, an integrated circuit device comprises a processor and a secure protection zone with security properties that can be verified by a remote device communicating with the integrated circuit device. The secure protection zone includes a persistent storage that is configured for storing cryptographic keys and data. The secure protection zone also includes instructions that are configured for causing the processor to perform cryptographic operations using the cryptographic keys. In addition, the secure protection zone includes an ephemeral memory that is configured for storing information associated with the cryptographic operations. The instructions are configured for causing the processor to perform the cryptographic operations on the data stored in the persistent storage and the information in the ephemeral memory as part of a secure communication exchange with the remote device.

Particular implementations of the integrated circuit device may include one or more of the following features. The device may be configured to be included in a client device that is coupled to a remote device acting as a host of the client device. At least one of the data stored in the persistent storage and the information stored in the ephemeral memory may include information associated with the client device. The device may be configured to authenticate the information to the remote host device. The processor may include a digital processing element.

The device may be configured to authenticate only information that is included in the secure protection zone. The authentication may be based on performing the cryptographic operations on the information using the cryptographic keys stored in the persistent storage.

The persistent storage may be configured for securely storing the cryptographic keys and the data such that modifications to at least one of the cryptographic keys and the data is restricted. The persistent storage may be configured for securely storing the cryptographic keys and the data such that modifications to at least one of the cryptographic keys and the data is detectable by the remote device.

The cryptographic operations may be selected from a group consisting of random number generation, key generation, signature computation, digest computation, usage authorization, signature verification, encrypted read, encrypted write and general purpose input output (GPIO) access. The cryptographic keys may include an asymmetric private key stored in the persistent storage. The key generation may include at least one of an asymmetric public key generation based on the asymmetric private key, and a symmetric key or an additional asymmetric private key generation based on a random number produced within the secure zone using the cryptographic operations performed by the processor.

The instructions may be configured for causing the processor to perform a first set of cryptographic operations on the data that is stored in the persistent storage, and a second set of cryptographic operations that is different from the first set on data external to the secure protection zone. The ephemeral memory is configured for storing at least one of results of the cryptographic operations on the data using the cryptographic keys, and information received from the remote device as part of a secure communication exchange.

The device may comprise an information generation module that is configured for generating information internal to the device. The instructions may be configured for causing the processor to perform cryptographic operations on the generated information using the cryptographic keys. The information generation module may be configured for generating information associated with a state of an input pin of the device. The information generation module may include a sensor. The generated information may include data generated by the sensor. The sensor may be selected from the group consisting of a temperature sensor, a pressure sensor and a voltage sensor.

In another general aspect, a client device sends a parent public key and an associated certificate to a host device coupled to the client device. The parent public key, the certificate and a corresponding parent private key are stored in secure persistent storage included in a secure device associated with the client device. The client device generates a child private key based on a random number produced within the secure device, and a child public key associated with the child private key. The child private and public keys are generated within the secure device. The client device generates a first signature based on the child public key and information associated with the secure device. The first signature is generated within the secure device. The client device sends the child public key and the first signature, to the host device.

Particular implementations may include one or more of the following features. Generating the first signature may comprise combining, by the secure device, a nonce with the child public key to generate a digest. The digest may include information associated with the secure device. The secure device may generate the first signature by performing an asymmetric signature computation on the digest using the parent private key.

The nonce may be generated by a random number generator included in the secure device. Combining the nonce with the child public key to generate the digest may comprise combining, by the secure device, the nonce with the child public key to generate a first digest. The secure device may combine the first digest with the information associated with the secure device to generate a second digest. The secure device may generate the first signature by performing an asymmetric signature computation on the second digest using the parent private key.

The information associated with the secure device may include at least one of state information of the secure device, key storage configuration information, key storage state information and command parameters. At least one of the parent private key and the child private key may be restricted to signing data that is generated by the secure device.

The client device may receive a random challenge from the host device. The client device may generate a second signature based on the random challenge using the child private key. The client device may send the second signature to the host device.

At least one of the first signature and the second signature may be generated using a hardware cryptographic engine included in the secure device. Generating the first signature may comprise using a first cryptographic operation, and generating the second signature may comprise using a second cryptographic operation that is different from the first cryptographic operation. The first cryptographic operation may be configured to be operable on data generated internally by the secure device. The second cryptographic operation may be configured to be operable on data generated external to the secure device.

The host device may receive the parent public key and the associated certificate from the client device. The host device may authenticate the parent public key based on the associated certificate. The host device may receive the child public key and the first signature from the client device. The host device may verify the first signature using the authenticated parent public key. Verifying the first signature may include verifying the information associated with the secure device. The host device may authenticate the child public key based on verifying the first signature. The associated certificate may be generated by a certificate authority at a time of manufacture of the secure device. The certificate authority may be trusted by the host device and the client device.

The details of one or more disclosed implementations are set forth in the accompanying drawings and the description below. Other features, aspects, and advantages will become apparent from the description, the drawings and the claims.

DETAILED DESCRIPTION

Some systems include various hardware components or devices that are coupled together to perform specific operations. Some devices may be configured to act as the host, that is, primary device while other components may be configured to act as the client or peripheral devices. Examples of such systems include a motherboard (host device) that has daughter cards (client devices) connected to it, and a laptop (host device) that has a battery pack (client device) connected to the laptop.

In such systems, it may be important to verify that a particular client device connected to a host is the correct client for performing a specific operation. For instance, a printer may ensure that the correct color cartridge is loaded in a particular slot because the wrong color may damage a print head; a memory module may have a failing element in a part of the array and be able to afford only a fraction of the rated density. Such verification may be performed by checking some kind of configuration information, or information pertaining to the version or model, of the client device.

Typically, such configuration, version or model information is embedded in hardware, such as read-only memory (ROM) on a chip, within the client device. The host authenticates this information when accessing the memory of the client device to ensure legitimate operation.

In some cases, it may be important to verify that the configuration, version or model information stored in the client device has not been copied, cloned or modified. Proper and/or safe operation of the system may depend on the information stored in the client device being authentic. For example, medical consumables typically ship with calibration information designed specifically for that particular package; rechargeable battery systems are programmed with their particular configuration/capacity/parameters to prevent damage and/or fire during charging. As another example, an original equipment manufacturer (OEM) may design a single platform that sells at various price points to implement different levels of functionality. To reduce cost, the OEM may build just a single system, but store the enabled features in a secure list in embedded ROM or other nonvolatile storage.

Some systems may verify the information embedded in hardware, or internally stored in some suitable manner, by performing symmetric cryptographic operations, for example, using the 256-bit Secure Hash Algorithm (SHA-256) with a secret key that is shared by the host and client devices. However, in such systems, the host or any device that is performing the verification has to have prior knowledge of the secret with the client device. This may result in the host device costing more, and reduces scalability by limiting the verification space to those entities that have commonly share the secret.

On the other hand, if asymmetric cryptographic mechanisms based on public-private key pairs are used, then the host device can readily obtain information on the public key of the client device without a secret being shared. In systems implementing asymmetric cryptography, the client device or the element to be verified usually has a private key that is unique and known only to the client device. The private key may be embedded in hardware in the client device. When information is presented to the client device, the private key is used to sign the information for verification. If the private key is effectively protected, then such a mechanism provides good confidence that the signed information was physically presented to the device holding the key.

In this context, effectively protected means that a significant effort would be required to obtain the private key value by an unauthorized component or entity. Some of the methods that may be used to obtain the private key include input/output (IO) analysis of the hardware storing the key, micro-probing, timing analysis, emissions analysis and external stimulus such as clock or voltage or temperature. When the key or some other information is effectively protected, if one client device is successfully compromised such that its private key is disclosed to an unauthorized entity, it should not be possible to publish the results or method of the attack such that a second party could execute the same attack on a separate system with little or no effort. However, even if such effective protection is provided, a remote entity verifying the information, such as a host device, may not have a suitable mechanism for verifying that the information is stored securely such that disclosure and/or modification is restricted in a particular manner.

In some systems, for robust security, there may be some additional procedures that are used to validate that the particular public and private key pair is authentic, that is, proof that the public and private key pair belongs to the client device that claims to hold the key, and the public or private key has not been modified by some unauthorized entity. Additional verification procedures may be implemented in software or firmware schemes, but such implementations do not offer measurable security as the software or firmware may be cloned more easily.

Strong security may be provided by implementing the additional security procedures in hardware, for example, combining some hardware characteristic of the client device with the stored keys while performing the cryptographic operations. In this manner, the system may ensure that sensitive information is stored in a device whose origin and security properties are known. Therefore, the information is protected at the security level offered by the device type. In addition to the data, the mechanisms that are applied for securing the data are also protected such that the verifying entity can have knowledge of the selected security options, and be aware that the selected options are also securely protected. In addition, the verifying entity should be able to verify that the signing key cannot be used to sign any arbitrary externally provided data that might be used to spoof the protected information. Such a secure device may be configured to provide secure storage for configuration and/or state information associated with the devices, apart from secure storage for the cryptographic keys. The configuration and/or state information associated with the secure device may be used when signatures are generated by the device.

Figure 1:
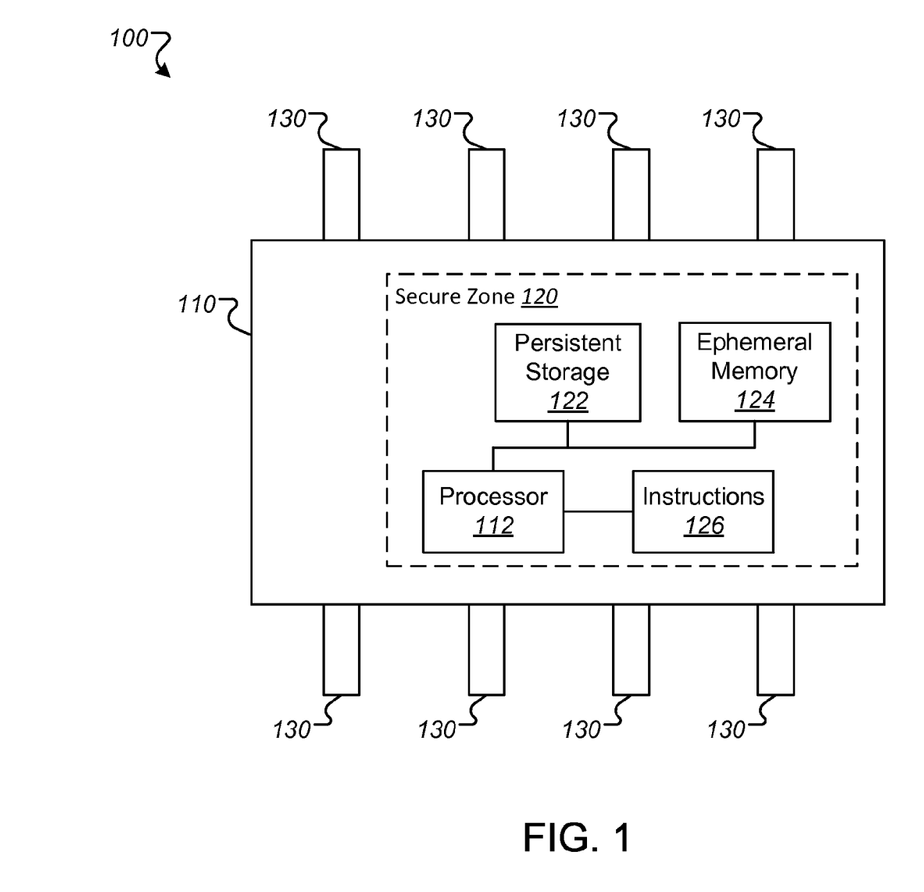
FIG. 1 is a conceptual block diagram of an exemplary device that may be used for secure storage and signature.

FIG. 1 is a conceptual block diagram of an exemplary device 100 that may be used for secure storage and signature. In some implementations, the device 100 may be an integrated circuit (IC) device, while in other implementations, the device 100 may be any chip or hardware component that is configured for implementing verifiable security procedures that involve the device characteristics.

The device 100 includes a body 110 with pins 130 attached to the body. The body 110 includes a processor 112 and a secure zone 120 that has persistent storage 122, ephemeral memory 124 and instructions 126.

In some implementations, the body 110 may include some semiconductor material and include transistors. The processor 112 may be configured for performing various operations such as input/output operations, security commands and cryptographic operations. In some implementations, the processor 112 may include a digital processing element. In some other implementations, the processor 112 may be a general purpose microprocessor.

The secure zone 120 is a portion of the body 110 that implements strong security mechanisms such that the data included in the secure zone 120 is not easily copied, cloned or modified, and any unauthorized change to the data within is detectable by a verifying device. The persistent storage 122 is a section of the secure zone that includes persistent memory. For example, the persistent storage 122 may be an electronically erasable read-only memory (EEPROM) array. Alternatively, the persistent storage 122 may be a flash memory, or a hard drive, or any other suitable storage mechanism that is configured for storing data in a persistent manner. The persistent storage 122 may be used for storing cryptographic keys, miscellaneous read/write, read-only or secret data, consumption logging, and security configuration. Access to the various sections of the persistent storage may be restricted in a variety of ways and then the configuration locked to prevent changes.

The ephemeral memory 124 is another section of the secure zone that is used for temporary storage of data. For example, the ephemeral memory 124 may be a static random access memory (SRAM) where the results of cryptographic operations are buffered during secure communications exchanges with a verifying device. In some implementations, the ephemeral memory 124 may be used to store the input command or output result, intermediate computation values, and/or an ephemeral key. The entire contents of the ephemeral memory 124 may be invalidated whenever the chip goes into sleep mode or the power is removed.

The ephemeral key that is stored in ephemeral memory 124 may be used as an input to various cryptographic operations, such as key generation, signature generation or verification, or some other suitable operation. The ephemeral key also may be used as the data protection (encryption or decryption) key by the read and write operations in the persistent storage 122.

The instructions module 126 is a section of the secure zone that stores various instructions performed by the device 100. For example, the instructions module 126 may include cryptographic instructions that are configured to cause the processor 112 to perform cryptographic operations on the data stored in the persistent storage 122 and in the ephemeral memory 124.

In some implementations, the processor 112 may be included in the secure zone 120, while in other implementations, the processor 112 may be outside the secure zone. In some implementations, the secure zone may encompass the whole body 110 of the device 100.

The pins 130 couple the device 100 as a component of a larger client device. In some implementations, the pins 130 protrude from the body 110, while in other implementations, the pins 130 may not protrude from the body 110. The pins 130 are configured for providing an interface between the client device and the data and instructions in the body 110. The pins may also be configured for connecting a power source to the device 100. For example, the pins 130 may provide a high-speed single pin interface. Alternatively, or in addition, the pins 130 may provide a 1 Megahertz (MHz) standard inter-integrated circuit (I2C) interface using two pins, or alternatively various single wire interface protocols using a single pin. Although eight pins 130 are shown in FIG. 1, the device 100 may include a different number of pins which may be less than or greater than the number shown.

The device 100, and in particular the secure zone 120, provides a wide array of defensive mechanisms that are configured to prevent physical attacks on the device 100, or logical attacks on the data transmitted between the device 100 and the system in which the device is used. The secure zone 120 may implement hardware restrictions on the ways in which the cryptographic keys are generated or used within the secure zone, which provides additional security against attacks.

In some implementations, a unique serial number is associated with the device 100, which may be stored in the persistent storage 122. By using cryptographic instructions 126 that are supported by the device 100, a host system may verify that the serial number is authentic and not a copy.

In some implementations, the instructions 124 provide a flexible command set that allows the device 100 to be used in a wide variety of applications. For example, the device 100 may be used in anti-counterfeiting to validate the authenticity of a removable, replaceable, or consumable client such as printer ink tanks, electronic daughter cards, or other spare parts, or a software/firmware module or memory storage element.

As another application, the device 100 may be used for protection of firmware or media. For example, the instructions 124 may validate code stored in flash memory at boot to prevent unauthorized modifications, encrypt downloaded program files as a common broadcast or uniquely encrypt code images to be usable on a single system only.

Another application of the device 100 may be in session key exchange. For example, the device 100 may be used by the client device to securely and easily exchange session encryption keys for use by an encryption/decryption engine in the system microprocessor to support a confidential communications channel or an encrypted download.

Yet another application of the device 100 may be in secure data storage. For example, secret keys may be stored in the persistent storage 122 for use by cryptographic accelerators in standard microprocessors. The persistent storage 122 also may be used to store data for configuration, calibration, electronic purse value, consumption data, or other secrets. By supporting encrypted/authenticated reads and writes, the device 100 may provide programmable protection.

The device 100 also may be used for password checking. For example, the instructions 124 may cause the processor 112 to validate user entered passwords without letting the expected value become known, map simple passwords to complex ones and securely exchange password values with remote system. In order to perform such operations, the ephemeral memory 124 may be used as a "scratchpad" to store intermediate results of cryptographic computations.

In some implementations, the device 100 may incorporate a number of physical security features that are designed to protect the contents of the persistent storage 122 from unauthorized exposure. For example, the device 100 may include an active shield over the part of the device that houses the persistent storage 122. Alternatively, or in addition, the device 100 may include internal memory encryption, glitch protection or voltage tamper detection, or any combination of the above, or any other suitable mechanism. In some implementations, pre-programmed transport keys stored on the device 100 may be encrypted in such a way as to make retrieval of their values using outside analysis very difficult. In some implementations, both the logic clock and logic supply voltage for the device 100 may be internally generated, preventing any direct attack on these two signals using the pins of the device 100.

Figure 2:
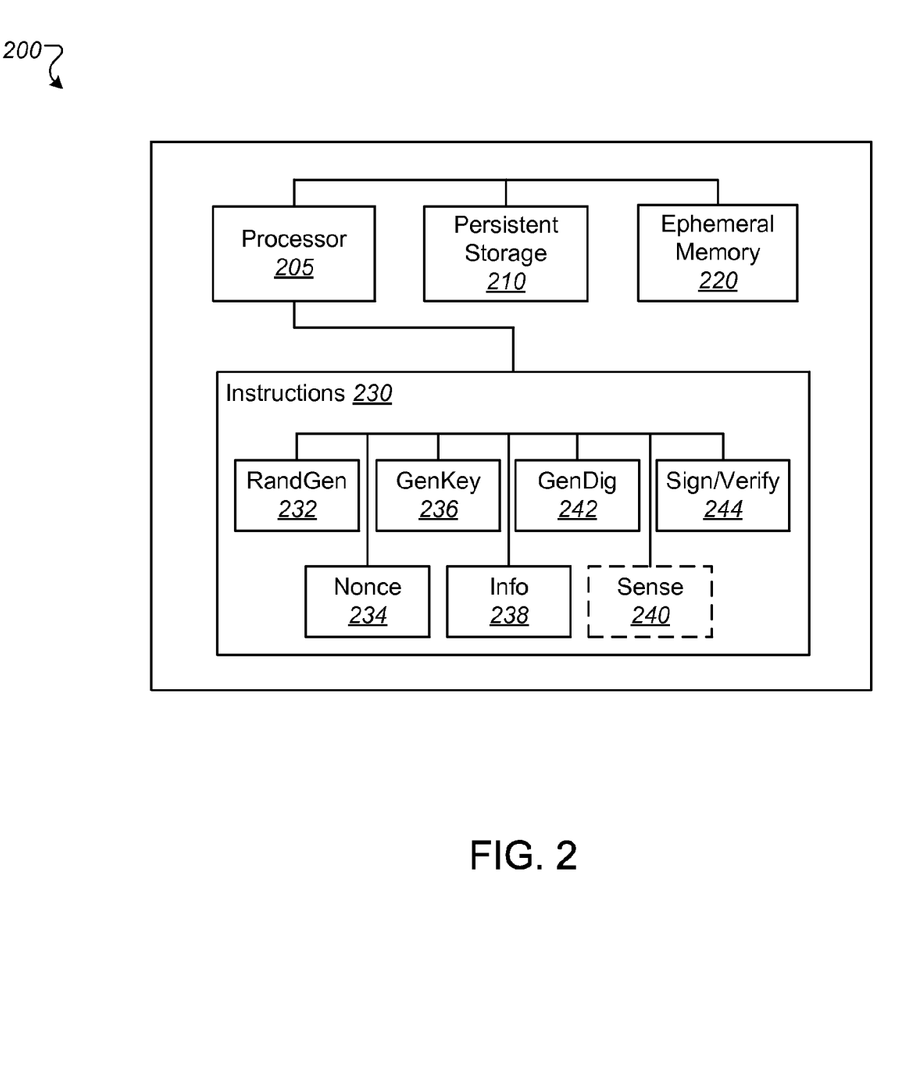
FIG. 2 is a conceptual block diagram of sections within a secure zone of a device for secure storage and signature.

FIG. 2 is a conceptual block diagram of sections within a secure zone 200 of a device for secure storage and signature. In particular, FIG. 2 illustrates some of the cryptographic instruction modules that may be included in the secure zone 200 for providing strong security. The device may be same as the device 100 and the secure zone 200 may be same as the secure zone 120.

The secure zone 200 includes processor 205, persistent storage 210, ephemeral memory 220 and instructions 230. The instructions 230 include modules RandGen 232, Nonce 234, GenKey 236, Info 238, Sense 240, GenDig 242 and Sign/Verify 244.

The processor 205 is similar to the processor 112. In some implementations, the processor 205 may be included in the secure zone 200, while in other implementations, the processor 205 may be outside the secure zone.

The persistent storage 210 is similar to the persistent storage 122, while the ephemeral memory 220 is similar to the ephemeral memory 124. The instructions module 230 stores various instructions performed by the device that includes the secure zone 200, such as the device 100. For example, as illustrated, the instructions module 230 includes various modules, each of which is associated with a set of instructions that is configured to cause the processor 205 to perform certain operations on data stored in the persistent storage 210 and in the ephemeral memory 220.

The RandGen module 232 is associated with generating a random number that is used as a seed for cryptographic operations performed by the device that includes the secure zone 200, such as device 100. For example, the RandGen module 232 may include a random number generator that returns a certain number of random bytes (for example, 32 random bytes) to the system. In some implementations, the device combines this generated random number with a separate input number to form a nonce that is stored within the device and may be used by subsequent commands.

In some implementations, random numbers are generated from a combination of the output of a hardware random number generator and an internal seed value, which is not externally accessible. The internal seed is stored in the persistent storage 210 and may be updated once after every power-up or sleep/wake cycle. After the update, this seed value may be retained in registers within the device that are invalidated if the device enters sleep mode or the power is removed.

In some implementations, there may be an endurance specification for the persistent storage 210 that limits the number of times the seed in the persistent storage can be updated. In such cases, the device may be configured to manage the power cycles such that the number of updates of the seed value are reduced. In certain circumstances, the device may suppress the seed update using parameters associated with other instruction modules.

The device may use the RandGen module 232 for various purposes. For example, the random number generator may be used to provide the input challenge to a message authentication code (MAC) command on some separate chip that is configured for cryptographic authentication operations. In some implementations, the device may provide a special "Random" command for such uses without affecting the internally stored nonce.

The Nonce module 234 is associated with instructions for generating a nonce for use by a subsequent cryptographic operation. The nonce may be generated by combining an internally generated random number with an input value from the system. The resulting nonce is stored internally in ephemeral memory 220, and the generated random number is returned to the system.

The input value may be designed to prevent replay attacks against the host device in the system—the input value may externally generated by the system and passed into the device using the instructions associated with the Nonce module 234. The input value may be any value that changes consistently, such as a nonvolatile counter, current real time of day, or it can be an externally generated random number.

To provide a nonce value for subsequent cryptographic operations, the Nonce module 234 may be configured for generating a message digest of an input number and output random number. The resulting message digest is the nonce value, which may be stored in a register in the device. The nonce can then be used by a subsequent cryptographic operation.

In some implementations, the actual nonce value may be used by an external system. In such implementations, the nonce value may be externally computed and stored externally to complete the execution of commands by the external system. In some implementations, the nonce may be a fixed value that is chosen by the host system.

In this context, a nonce is an arbitrary number that is used only once in a cryptographic communication between devices. The nonce may be a random or pseudo-random number issued in an authentication protocol to ensure that old communications cannot be reused in replay attacks. A nonce also may be used to ensure security for a stream cipher. Where the same cryptographic key is used for more than one message then a different nonce may be used to ensure that the keystream is different for different messages encrypted with that key. Often the message number is used.

To ensure that a nonce is used only once, it should be time-variant (including a suitably fine-grained timestamp in its value), or generated with enough random bits to ensure a probabilistically insignificant chance of repeating a previously generated value.

A message digest, in this context, is associated with a cryptographic hash function that takes an arbitrary block of data and returns a fixed-size bit string, the (cryptographic) hash value, such that any change to the data, either accidental or intentional, will change the hash value with very high probability. The data to be encoded is often called the "message," and the hash value is sometimes called the message digest, or simply as the digest.

For a cryptographic hash function that provides strong security, even though it may be relatively easy to compute the digest for any given message, it is infeasible to do the reverse computation, that is, generate a message that has a digest. In addition, it is infeasible to modify a message without changing the digest, or to find two different messages with the same digest.

Referring back to the GenKey module 236, the digest calculation can be performed using either a public key computed from a private key in persistent storage 210, or using a public key already stored in persistent storage. If the latter, then appropriate checks for prior authentication, limited use or other access restrictions may be performed on the persistent storage location.

The GenKey module 236 is associated with instructions for key computation and digest calculation. For example, the GenKey module 236 includes instructions configured for creating a new, random private key and writing that key into persistent storage 210. In some implementations, the random number generator seed will be automatically updated prior to the execution of these instructions, if the random number generator seed has not been already updated in the present power cycle.

The GenKey module 236 also may include instructions for generating a public key, such as an Elliptic Curve Cryptography (ECC) public key, based on a private key stored in the persistent storage. These instructions may be used to avoid storing the public key on the device at the expense of the time required to regenerate it.

In addition, the GenKey module 236 may include instructions for combining a public key with a temporary key value stored in ephemeral memory 220, calculating a cryptographic message digest (for example, a SHA-256 digest) of the resulting message and placing the digest back in ephemeral memory 220. The calculated digest can be used as the message for an internal signature or as a component of a MAC computation.

The Info module 238 is associated with instructions for providing information related to a configuration or state of the device hosting the secure zone 200. In some implementations, the instructions for the Info module 238 includes a mode parameter. The instructions access some static or dynamic information from the chip depending on the value of mode parameter. For example, for an integer value '0' of the mode parameter, the instructions may return a single 4-byte word representing the revision number of the device. For an integer value '1' of mode, the instructions may return a integer value of 1 if an ECC private or public key stored in a persistent memory 210 location, which is specified by the instructions, is valid, and 0 if the key is not valid. For an integer value '2' of mode, the instructions may return various dynamic state information of the device.

In some implementations, the device housing the secure zone 200 may be coupled to a sensor. For example, the device 100 may include a temperature sensor, a pressure sensor, optical sensor, or voltage sensor. The sensor may be calibrated during manufacturing test of the device and the resulting calibration data may be stored as part of configuration data within the secure zone 200. The accuracy of the calibration combined with the basic accuracy of the sensor may provide the accuracy specified in the parametric table for the sensor. In such implementations, the instructions module 230 may include the Sense module 240. The dotted lines around the Sense module 240 indicate that the Sense module 240 may not be present in all implementations, for example, in cases where the device is not coupled to a sensor.

The Sense module 240, when present, is associated with instructions for reading a value provided by the sensor. For example, the instructions may return a temperature reading when a temperature sensor is integrated. The temperature sensor may be configured to measure the temperature of the semiconductor die of the device housing the secure zone 200. The processor 205 obtains high and low reading values from the temperature sense hardware on the device by executing the instructions associated with the Sense module 240. The high and low readings are then combined with the calibration data.

In some implementations, the sensor may be an external sensor that is accessed via secure processing elements. In such implementations, the sense module 240 may be associated with instructions for reading a value provided by the sensor that is retrieved by the secure processing elements.

In some implementations, the Sense module 240 may be present in a device that is not coupled to a sensor. In such implementations, the instructions associated with the Sense module 240 may be configured to return an error when accessed.

The GenDig module 242 is associated with instructions for generating a digest. In some implementations, the instructions corresponding to the GenDig module 242 uses a hashing function, such as SHA-256 or the MD5 message-digest algorithm, to generate a digest by combining a value stored in persistent storage 210 with contents of a location in ephemeral memory 220 that stores a temporary key value. The value stored in persistent storage 210 can come from one of the data locations or configuration zone in persistent storage 210, page locations for one-time passwords (OTP) present in persistent storage 210, or retrieved from some hardware transport key array. In some implementations, the value stored in persistent storage 210 may be a key or some other secret value. In such implementations, the digest may serve to connect the authentication action to a diversity of secret values.

The generated digest may be stored in ephemeral memory 220, and used in several ways. For example, the digest may be included as part of a message used by cryptographic operations, such as those associated with the Sign/Verify module 244, to generate or verify a signature. In such cases, the digest may serve to authenticate data stored in data locations or OTP page locations in persistent storage 210. As another example, the digest may be used as a data protection digest to provide authentication and/or confidentiality for the data when used by a read or write operation. In yet another example, the instructions associated with the GenDig module 242 may be used for secure personalization by using a value from a transport key array. The resulting data protection digest would then be used by a write operation.

The Sign/Verify module 244 is associated with instructions for generating a signature, or verifying a signature, or both. In some implementations, the instructions for generating a signature and the instructions for verifying a signature may be associated with different modules, for example, a sign module and a different verify module respectively. However, in other implementations, the instructions may be combined in the same module, as illustrated in FIG. 2.

Some of the instructions corresponding to the Sign/Verify module 244 are configured for generating a signature using, for example the Elliptic Curve Digital Signature Algorithm (ECDSA). A private key, such as an ECC private key, stored in persistent storage 210 may be used for computing the signature on a message, which may be generated either internal to the device, or externally. In case of external message generation, the system may externally compile the information to be signed, and compute the digest of that information using instructions for an external hash algorithm. The digest is then loaded into ephemeral memory 220 using, for example, the instructions corresponding to the Nonce module 234.

For internal message generation, the message that is to be signed is generated internal to the device. For example, the message may include the output of instructions corresponding to the GenKey module 236 or the GenDig module 242, along with various other state information related to the device. The output of the instructions corresponding to the GenKey module 236 or the GenDig module 242 may be placed in ephemeral memory 220 and combined with configuration information regarding a cryptographic key used for the calculations. In this manner, the information being authenticated by the device with the secure zone 200 includes information corresponding to the state or configuration of the device to provide strong security.

Some of the instructions corresponding to the Sign/Verify module 244 are configured for verifying whether a signature has been correctly generated from a given message and public key. In some implementations, the verification may be performed in an external mode, in which the public key to be used is an input parameter for the instructions. Prior to executing the instructions, the message corresponding to the signature is written to ephemeral memory, for example using the instructions corresponding to the Nonce module 234. In the external mode, the device accelerates the public key computation and returns a Boolean value (for example, "True" or "False") as a result of the verification.

In some implementations, the verification may be performed in stored mode, in which the public key to be used is retrieved from persistent storage 210, and the message is previously stored in ephemeral memory 220. Various configuration checks may be performed on the public key. If the configuration checks are successful, then the public key verification computation is performed and a Boolean value is returned as a result. Otherwise, an execution error is returned.

In some implementations, the instructions corresponding to verification may be used in validate mode. In this mode, the instructions are configured to validate a public key stored in persistent storage 210.

While only a few modules are shown in FIG. 2 and described in the previous sections, the instruction module 230 may include other cryptographic modules in addition to, or instead of, the modules described previously. For example, the instruction module 230 may include DeriveKey module, Lock module, PrivWrite module, Read module and Write module, apart from other modules.

The DeriveKey module is associated with instructions that are configured for combining the current value of a key with the nonce stored in ephemeral memory 220 using a hashing mechanism, such as SHA-256, and placing the result into a target location in persistent storage 210. The DeriveKey module instructions are configured to return an error is the target location already stores a private key, or the target location is locked, among other conditions.

The Lock module is associated with instructions that are configured for preventing future modification of the configuration zone and/or data and OTP page locations in persistent storage 210. In some implementations, the Lock module instructions may be used to lock individual data locations in persistent storage 210. In some implementations, prior to performing the locking operations, the instructions may verify the integrity of the contents of the locations to be locked, for example using a cyclic redundancy check (CRC) algorithm.

The PrivWrite module is associated with instructions that are configured for writing cryptographic private keys into the persistent storage 210. The location in persistent storage 210 where a key is to be written is presented to the instructions as an input parameter.

The Read module is associated with instructions that are configured for reading contents from the persistent storage 210 or the ephemeral memory 220. The contents may be read as words, for example, as a 4-byte word or an 8-word block of 32 bytes. In some implementations, the data being read may be encrypted before being returned to the system.

The Write module is associated with instructions that are configured for writing data to the persistent storage 210. The data may be written as words, for example, as a 4-byte word or an 8-word block of 32 bytes. In some implementations, the data to be written may be encrypted prior to being sent to the device for writing to the persistent storage 210. This may be useful, for example, to prevent snooping on the bus during personalization or system operation. In some implementations, the instructions associated with the Write module may not be used to write cryptographic private keys. For such implementations, the cryptographic private keys may be written using instructions corresponding to the PrivWrite module, as described previously.

Figure 3:
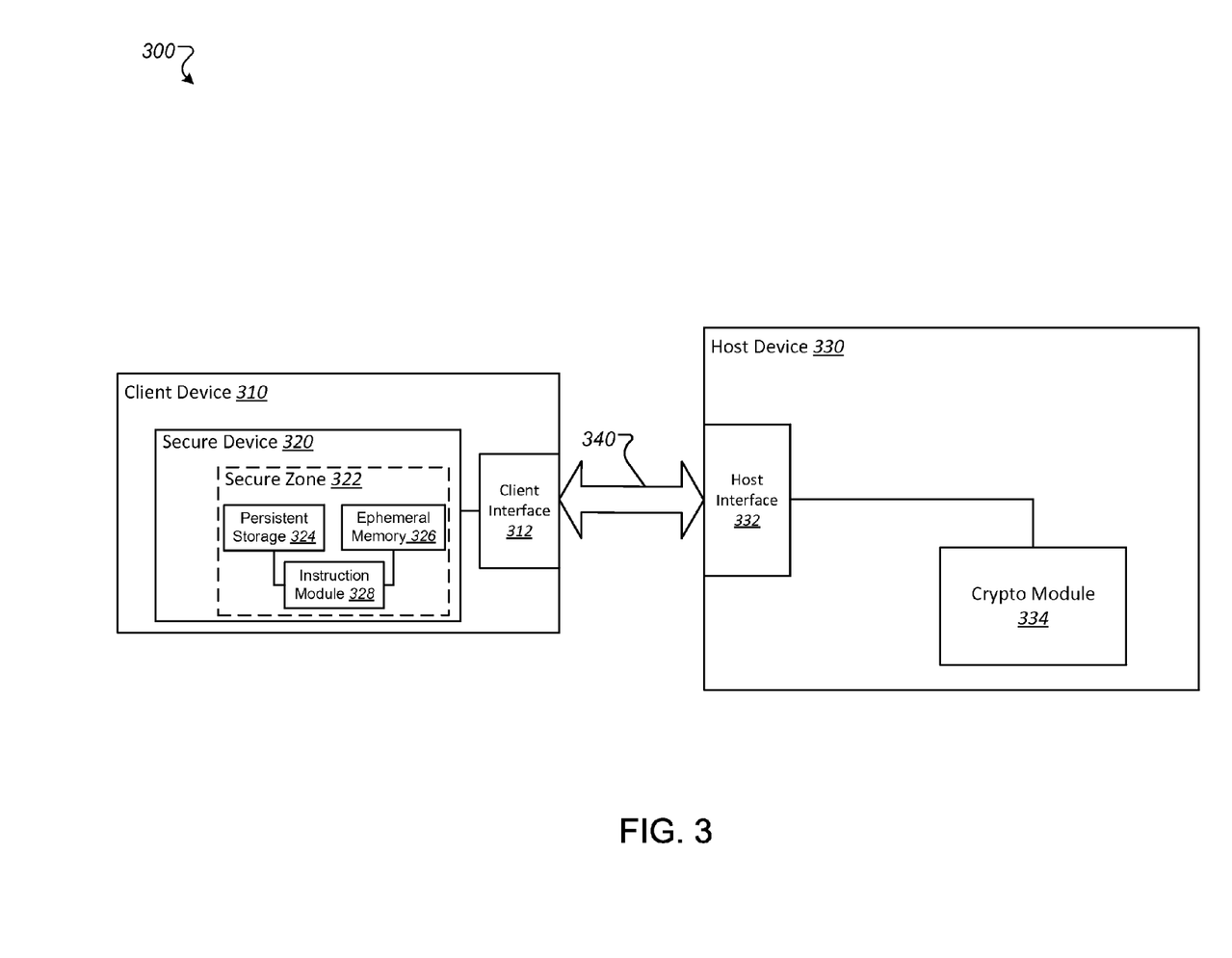
FIG. 3 illustrates an exemplary system in which a device for providing secure storage and signature may be applied.

FIG. 3 illustrates an exemplary system 300 in which a device for providing secure storage and signature may be applied. The system 300 includes a client device 310 that is coupled to a host device 330 using a connection 340. The client device 310 includes a secure device 320 and a client interface 312. The secure device 320 includes a secure zone 322 that houses persistent storage 324, ephemeral memory 326 and instruction module 328. The host device 330 includes a host interface 332 and a crypto module 334.

The client device 310 is similar to the client devices previously described. For example, the client device 310 may be a daughter card that is connected to a motherboard. As another example, the client device 310 may be a battery pack included in a laptop computer.

The client interface 312 is configured to enable the client device 310 to communicate with the host device 330. In some implementations, the client interface 312 may be a network interface that connects the client device 310 with a remote host device through a network. For example, the client interface 312 may include an Ethernet port or IEEE 802.11 chip, or a piece of software, such as software radio. In some other implementations, the client interface 312 may be an electrical interface that is configured to provide a physical coupling between the client device 310 and the host device 330.

The secure device 320 is similar to the secure device 100. The secure device 320 is configured to provide cryptographic operations, such as secure storage and signature, to the client device 310. By providing secure storage and signature services to the client device 310, the secure device 320 may facilitate strong security in the system 300. In some implementations, the secure device 320 may be a semiconductor chip, such as an IC chip, that is coupled to the client device 310. In some other implementations, the secure device 320 may be implemented as a memory device, such as flash memory, or as a field programmable gate array (FPGA) in the client device 310.

The secure zone 322 is similar to the secure zone 120 or the secure zone 200. The persistent storage 324 is similar to the persistent storage 122, or the persistent storage 210; the ephemeral memory 326 is similar to the ephemeral memory 124 or the ephemeral memory 220; and the instruction module 328 is similar to the instruction module 126, or the instruction module 230. In some implementations, the secure zone 322 may include a processor or a digital processing element, such as the processor 112 or the processor 205.

Although only a few components are shown for the client device 310, there may be other components and modules included in the client device in addition to, or instead of, the client interface 312 and/or the secure device 320.

The host device 330 is similar to the host devices previously described. For example, the host device 330 may be a motherboard that has a daughter card connected to it as a client device. As another example, the host device may be a laptop computer that includes a battery pack as the client device.

The host interface 332 is configured to enable the host device 330 to communicate with the client device 310. In some implementations, the host interface 332 may be a network interface that connects the host device 330 with a remote client device through a network. For example, the host interface 332 may include an Ethernet port or IEEE 802.11 chip, or a piece of software, such as software radio. In some other implementations, the host interface 332 may be an electrical interface that is configured to provide a physical coupling between the host device 330 and the client device 310.

The crypto module 334 may be a piece of hardware, such as an IC chip, or software embedded in non-transitory memory on the host device, or a combination of hardware and software. The crypto module 334 may provide cryptographic operations to the host device to facilitate secure communication with the client device.

The connection 340 is configured for coupling the client device 310 to the host device 320. In some implementations, where the client device and the host device are remote to one another, the connection 340 may be a network connection. For example, the connection 340 may be through a circuit-switched data network, a packet-switched data network, a Local Area Network (LAN), or any other network able to carry data, for example, Internet Protocol (IP)-based or asynchronous transfer mode (ATM)-based networks, including wired or wireless networks. In some other implementations, where the client device and the host device are most closely placed, the connection 340 may be a data cable. In yet other implementations, where the client device and the host device are physically coupled, the connection 340 may be a hardware interface, such as a PCI interface on a motherboard.

When the host device 330 communicates with the client device 310, the host device may establish a secure communication, for example, to authenticate the client device. In such cases, the secure device 320 may be configured to facilitate the secure communication with the host device. For example, the secure device 320 may use internally stored private keys to sign messages sent to the host device and include state or configuration information associated with the secure device as part of the signature to provide strong security, as discussed previously. On the host side, the crypto module 334 may verify the information provided by the secure device 334, and/or generate authenticated information for the host device that is verified by the secure device 320 when the information is received by the client device.

Although the system 300 shows a host-client configuration with the secure device 320 included in the client device 310, other configurations are also possible. For example, the secure device 320 may be included as part of the host device 330. In such cases, the crypto module 344 may be same as the secure device 320, the secure device 320 may replace the crypto module 344, or the secure device 320 may exist along with the crypto module 334.

Although the system 300 shows a host-client configuration with a single client device 310, other configurations are also possible. For example, the system 300 may include multiple client devices 310 that are connected to a single host device 330. In some implementations, the connection 340 may be shared among the multiple client devices 310, or the connection 340 may be replicated for each client device 310 connected to the host device 340.

In some implementations in which the secure device 320 is included in the host device 330, the client device 310 may not be present. In such cases, the secure device 320 may facilitate secure communication between the host device 330 and other devices, such as additional host devices. The secure device 320 also may be used to authenticate the host device to a user, or provide services to a user of the host device 330, such as secure e-mail services.

Figure 4:
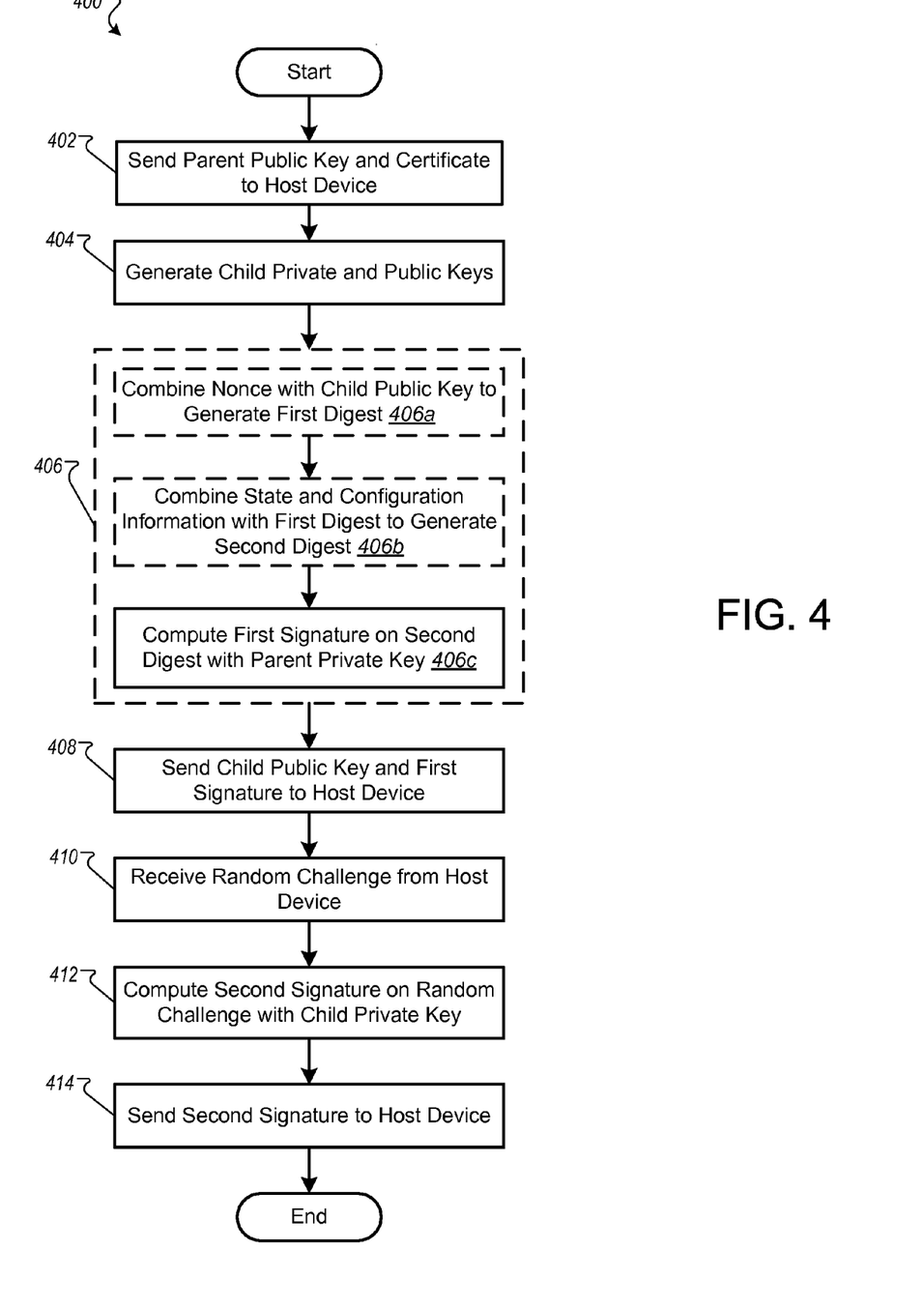
FIG. 4 is a flow chart illustrating an exemplary process for secure communication from a client that includes a secure device to a host.

FIG. 4 is a flow chart illustrating an exemplary process 400 for secure communication from a client that includes a secure device to a host. The process 400 may be performed by a client device that includes a secure device, such as secure device 320, for secure storage and signature. For example, the process 400 may be performed using the client device 310 in the system 300. The following describes the process 400 as being performed by components of the system 300. However, the process 400 may be performed by other circuits, systems or system configurations.

The process 400 may be performed by the client device as part of an initial secure exchange with the host device, for example, to generate a child public-private key pair for a subsequent secure data exchange, and to authenticate the child public key to the host device. The secure device at the client, such as secure device 320, includes a parent public and private key pair and an associated certificate, which verifies that the public key is associated with the secure device. The certificate may be computed by using a root key to sign a digest that is based on the parent public key, and thereby binds the parent public key to the certificate. The root key may be associated with a certificate authority (CA), which is trusted by the client device and the host device. For example, the parent public and private key pair may have been generated at the factory during manufacture of the secure device using an asymmetric key generation algorithm, such as ECC-based key generation. The root signature for the certificate may have been computed by the OEM acting as a CA. The parent public and private keys and the certificate may be written into persistent storage in the secure device at the time of manufacture.

When the client device establishes communication with the host device, the client sends to the host device the parent public key and the corresponding certificate (402). For example, the client device 310 may retrieve the parent public key and associated certificate stored in the secure device 320 and send it to the host device 330 over the connection 340.

Then the client device generates child private and public key pair (404). For example, the client device 310 may generate, using the secure device 320, a random public and private key pair using instructions corresponding to the GenKey module 236. The child private and public key pairs may be used for securing data exchange with the host device once the initial secure exchange phase is completed. This may be useful in some cases to protect the security of the parent private key by limiting its use to in the initial security exchange phase with the host device, and using the child keys to encrypt and/or authenticate data once the initial security exchange is completed.

The client device generates a first signature on the child public key (406). As part of generating the first signature on the child public key, the client device may combine a nonce with the child public key to generate a first digest (406a). For example, the client device 310 may generate, using the secure device 320, a nonce using the instructions corresponding to the Nonce module 234, and combine the nonce with the generated child public key using the GenKey module 236.

In some implementations, either the key to be signed or the signing key may require that the nonce be generated with the random number generator that is included in the secure device 320. Either key also may require that knowledge of an authorizing secret be proven prior to use. Either key also may have restrictions on the number of times that the key can be read, in which case computation of the first signature may fail if no more accesses to the key are permitted.

Then the client device may combine state and configuration information with the first digest to generate a second digest (406b). For example, the client device 310 may combine, using the secure device 320, state information associated with the secure device with the first digest using the GenKey module 236. Alternatively, or in addition, the secure device 320 may combine information on the configuration of the secure device that is retrieved from persistent storage 324. In some implementations, the secure device 320 may combine a sensor reading that is retrieved using the Sense module 240. The information combined with the first digest may include configuration information associated with the location in persistent storage used for storage of the child public or private keys, chip state information and command parameters.

Then the client device computes a first signature on the second digest with the parent private key (406c). For example, the client device 310 may sign, using the Sign/Verify module 244 implemented in the secure device 320, the second digest with the parent private key to generate the first signature.

In some implementations, the client device may generate a single digest that is based on combining the child public key with a nonce, or state and configuration information, or both, and then compute the first signature on the single digest. In such implementations, (406a) and (406b) may be combined together, as indicated by the dotted lines for each. In some other implementations, the client device may generate more than two digests, and compute the first signature on the last digest of the chain of digests.

The client device sends the child public key and the first signature to the host device (408). For example, the client device 310 sends the child public key and first signature generated by the secure device 320 to the host device 330 over the connection 340. In some implementations, the initial secure exchange is completed at this stage, and the client device can subsequently exchange data with the host device that is encrypted/authenticated using the child public and private key pair.

However, in other implementations, a few additional exchanges are performed to validate the child keys. In such implementation, the client device receives a random challenge from the host device (410). The client device computes a second signature on the random challenge with the child private key (412). For example, the client device 310 signs, using the Sign/Verify module 244 implemented in the secure device 320, the random challenge with the child private key to generate the second signature.

The client device sends the second signature to the host device (414). For example, the client device 310 sends the second signature generated by the secure device 320 to the host device 330 over the connection 340. The initial secure exchange is completed at this stage, and the client device can subsequently exchange data with the host device that is secured using the child public and private key pair.

In some implementations, the use of the parent private key and/or the child private key to sign an arbitrary digest may be constrained in order to provide confidence that the digest that the respective key does sign corresponds to an internal state, or configuration, and/or secrets stored in the secure zone 322. The secure device 320 may do this in a number of ways.

In some implementations, the secure device 320 may restrict the use of the signing key to situations where the digest is generated by the internal circuitry. The secure device 320 may achieve this if so configured, by tracking the state information associated with values stored in either persistent storage 324 or in ephemeral memory 326.

In some implementations, the secure device 320 may restrict the way in which a signature is calculated in order to provide a differentiation between a signature of an internally generated digest and an externally provided digest. For example, the format of the hashed data may include state bits that track the details of the digest calculation process. In addition, the command information for the instructions associated with the Sign operation may tracked in the generated digest. Alternatively, or in addition, the processing of the digest to create the actual input number to the asymmetric algorithm may be different when signing an internal digest compared to the case when signing an external digest. For example, in some implementations, the GenKey module 236 may be used for signing internal digests, while the GenDig module 242 may be associated with signing externally provided digests.

Figure 5:
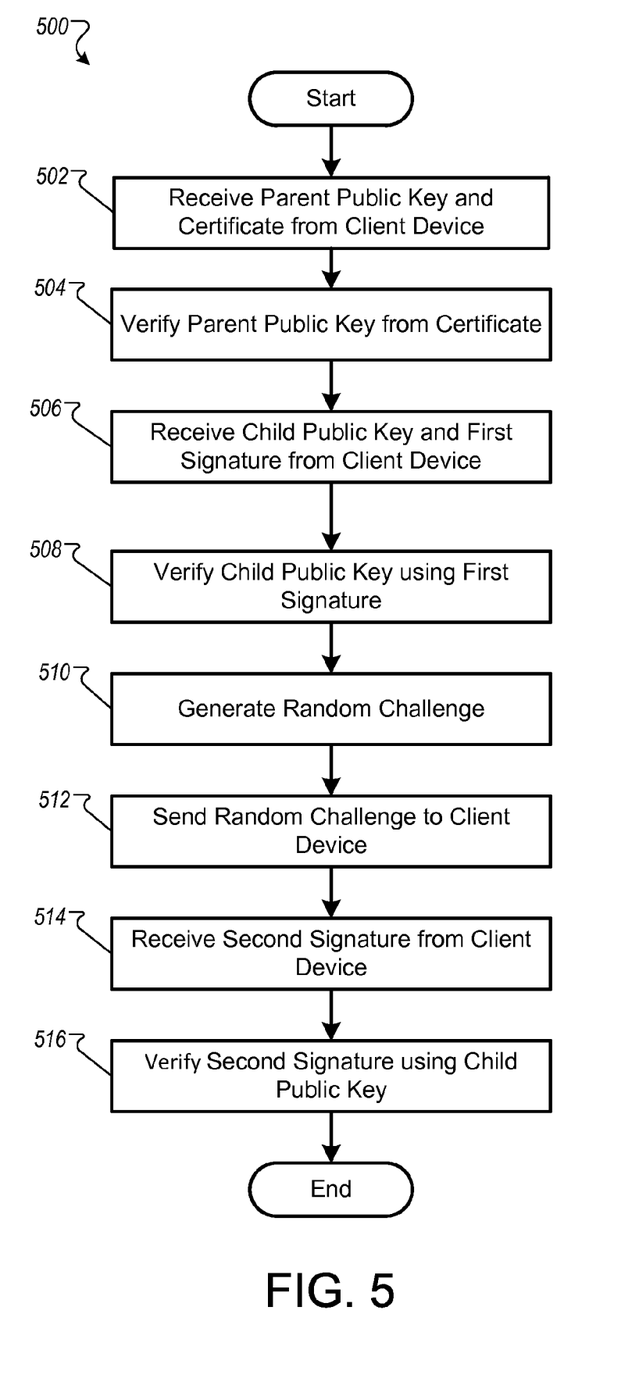
FIG. 5 is a flow chart illustrating an exemplary process for secure communication from a host to a client that includes a secure device.

FIG. 5 is a flow chart illustrating an exemplary process 500 for secure communication from a host to a client that includes a secure device. The process 500 may be performed by a host device communicating with a client device that includes a secure device, such as secure device 320, for secure storage and signature. For example, the process 500 may be performed by the host device 330 in the system 300. The following describes the process 500 as being performed by components of the system 300. However, the process 500 may be performed by other circuits, systems or system configurations.

The process 500 may be performed by the host device as part of an initial secure exchange with the client device, for example, to verify a child public key generated by the client device for a subsequent secure data exchange. In this regard, the process 500 may be the host device operations that are performed in tandem with the client device operations described by the process 400.

As part of the process 500, the host device receives a parent public key and corresponding certificate from the client device (502). For example, the host device 330 may receive a parent public key and associated certificate from the client device 310, in which the parent private key is stored in persistent storage 324 in the secure zone 322 of secure device 320.

The host device validates the parent public key from the certificate (504). For example, the host device 330 checks the root signature associated with the certificate received from the client device 310. The root signature may have been generated by a CA that is trusted by the host device 330, as described previously. In such cases, the host device 330 may successfully verify the parent public key from the certificate.

The host device receives a child public key and first signature from the client device (506). For example, the host device 330 receives from the client device 310 a child public key that has been generated by the secure device 320 and the first signature that has been computed by the secure device 320 based on the child public key using the parent private key. Along with the child public key and the first signature, the host device may receive state and/or configuration information associated with the secure device 320 that may have been used to compute the first signature.

The host device verifies child public key using the first signature (508). For example, the first signature may include a digest of the child public key and state and/or configuration information associated with the secure device 320 included in the client 310. The digest may be encrypted using the parent private key to generate the first signature. Upon receiving the first signature, the host device verifies the first signature using the parent public key and consequently verifies the child public key.

In some implementations, the host device decrypts the first signature using the parent public key and obtains the digest. The host device computes a second digest based on the child public key and the state and/or configuration information associated with the secure device 320 that are received from the client device. The host device may successfully verify the child public key if the second digest matches the digest that is obtained by decrypting the first signature using the parent public key. Thus, the host device 330 can verify that the child public key, on which the first signature is based, is also authentic, that is, it has been generated by the secure device 320 that is associated with the parent public/private key pair previously authenticated based on the root signature.

In some implementations, the initial secure exchange is completed at this stage. Subsequently, the host device may accept data sent by the client device that has been signed by the child public key as authentic, that is, the data has been generated by the client device. The host device also may decrypt and read communication that has been encrypted based on the child private/public key pair.

However, in other implementations, a few additional exchanges are performed to validate the child keys. In such implementations, the host device generates a random challenge (510) and sends the random challenge to the client device (512). Subsequently, the host device receives a second signature from the client device (514). For example, the host device 330 receives a signature in which the secure device 320 has signed the random challenge using the child private key.

The host device verifies the second signature using the child public key (516). For example, the host device 330 verifies the random challenge signature using the child public key, which has been previously verified by the host device. Upon verifying the second signature, the initial secure exchange is completed. The host device 330 can subsequently exchange data with the client device 310 that is secured using the child public and private key pair generated by the secure device 320.

As described in the preceding sections, by including information on the state or configuration of the secure device in computing the signature, the secure device provides robust security that is tied to the characteristics of the signing entity. As indicated previously, ECC may be used as the basis of the asymmetric cryptographic scheme for generating the keys and the signatures. However, other asymmetric cryptographic mechanisms also may be used, for example, the RSA public-key algorithm. In addition, different curves may be used with ECC, and signature schemes different from ECEDSA may be used, such as Digital Signature Algorithm (DSA) or Schnorr signature, or some other suitable mechanism.

In some implementations, the security provided by the secure device may be varied by implementing policy restrictions on the use of the signing key, for example by including identity information such as biometrics. The digests that are generated by the secure device may be implemented using programmable generation schemes, instead of fixed computation. In addition, the computations of the cryptographic keys may include usage properties of the keys as an alternative, or in addition to using the location in persistent storage where the keys are stored.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
   storing, in persistent storage included in a first device, a parent public key, a certificate corresponding to the parent public key and a parent private key corresponding to the parent public key, wherein the first device is associated with a client device and wherein the parent public key and the corresponding certificate are sent to a host device that is in communication with the client device;
   generating, by the first device, a child private key based on a random number produced within the first device, and a child public key corresponding to the child private key, the child private and public keys being generated within the first device;
   combining, by the first device, a nonce with the child public key and configuration information corresponding to the first device to generate a hashed digest, wherein the nonce is generated by the first device;
   generating, by the first device, a first signature by performing signature computation on the hashed digest, the first signature being generated within the first device, wherein generating the first signature comprises:
   determining, by the first device, that the hashed digest is generated internally by the first device;
   in response to determining that the hashed digest is generated internally by the first device, signing, by the first device, the hashed digest using a first cryptographic operation that is configured to be performed on data generated internally by the first device, wherein the first device is configured to use a second cryptographic operation different from the first cryptographic operation to operate on data generated external to first device; and
   sending the child public key and the first signature to the host device.

2. The method of claim 1, wherein generating the first signature comprises:
generating, by the first device, the first signature by performing signature computation on the hashed digest using the parent private key.

3. The method of claim 2, wherein the nonce is generated by a random number generator included in the first device.

4. The method of claim 2, wherein combining the nonce with the child public key and the configuration information corresponding to the first device to generate the hashed digest comprises:
combining, by the first device, the nonce with the child public key to generate a first hashed digest;
combining, by the first device, the first hashed digest with the configuration information corresponding to the first device to generate a second hashed digest; and
generating, by the first device, the first signature by performing signature computation on the second hashed digest using the parent private key.

5. The method of claim 1, wherein the configuration information corresponding to the first device includes at least one of key storage configuration information, key storage state information or command parameters.

6. The method of claim 1, wherein generating the first signature further comprises:
tracking, by the first device, state information associated with data values stored in memory included in the first device;
based on tracking the state information, determining, by the first device, whether a hashed digest to be signed is generated by the first device; and
in response to determining that the hashed digest is generated by the first device, signing, by the first device, the hashed digest using one of the parent private key or the child private key.

7. The method of claim 1, comprising:
receiving, at the first device, a random challenge from the host device in response to sending the child public key and the first signature to the host device;
generating, by the first device, a second signature based on the random challenge using the child private key; and
sending the second signature to the host device.

8. The method of claim 7, wherein at least one of the first signature or the second signature is generated using a hardware cryptographic engine included in the first device.

9. The method of claim 7, wherein generating the second signature comprises using the second cryptographic operation to generate the second signature.

10. The method of claim 1, further comprising:
receiving, by the host device, the parent public key and the corresponding certificate from the client device;
authenticating, by the host device, the parent public key based on the corresponding certificate;
receiving, by the host device, the child public key and the first signature from the client device;
verifying, by the host device, the first signature using the authenticated parent public key, wherein verifying the first signature includes verifying the configuration information corresponding to the first device; and
authenticating, by the host device, the child public key based on verifying the first signature.

11. The method of claim 1, wherein the certificate corresponding to the parent public key is generated by a certificate authority at a time of manufacture of the first device, the certificate authority being trusted by the host device and the client device.

12. The method of claim 1, wherein the configuration information corresponding to the first device includes information associated with a state of a physical input pin of the first device.

13. The method of claim 1, wherein the configuration information corresponding to the first device includes data generated by a sensor that is coupled to the first device.

14. The method of claim 13, wherein the sensor is selected from the group consisting of a temperature sensor, a pressure sensor and a voltage sensor.

15. An apparatus comprising:
a processor;
a first device;
a persistent storage included in the first device; and
a storage medium coupled to the processor and configured for storing instructions, which, when executed by the processor, are configured to cause the processor to perform operations comprising:
storing, in the persistent storage, a parent public key, a certificate corresponding to the parent public key and a parent private key corresponding to the parent public key, wherein the first device is associated with a client device and wherein the parent public key and the corresponding certificate are sent to a host device that is in communication with the client device;
generating, by the first device, a child private key based on a random number produced within the first device, and a child public key corresponding to the child private key, the child private and public keys being generated within the first device;
combining, by the first device, a nonce with the child public key and configuration information corresponding to the first device to generate a hashed digest, wherein the nonce is generated by the first device;
generating, by the first device, a first signature by performing signature computation on the hashed digest, the first signature being generated within the first device, wherein generating the first signature comprises:
determining, by the first device, that the hashed digest is generated internally by the first device;
in response to determining that the hashed digest is generated internally by the first device, signing, by the first device the hashed digest using a first cryptographic operation that is configured to be performed on data generated internally by the first device,
wherein the first device is configured to use a second cryptographic operation different from the first cryptographic operation to operate on data generated external to first device; and
sending the child public key and the first signature to the host device.

16. The apparatus of claim 15, wherein generating the first signature comprises:
generating, by the first device, the first signature by performing signature computation on the hashed digest using the parent private key.

17. The apparatus of claim 16, wherein the nonce is generated by a random number generator included in the first device.

18. The apparatus of claim 16, wherein combining the nonce with the child public key and the configuration information corresponding to the first device to generate the hashed digest comprises:
combining, by the first device, the nonce with the child public key to generate a first hashed digest;

combining, by the first device, the first hashed digest with the configuration information corresponding to the first device to generate a second hashed digest; and generating, by the first device, the first signature by performing signature computation on the second hashed digest using the parent private key.

19. The apparatus of claim 15, wherein the configuration information corresponding to the first device includes at least one of key storage configuration information, key storage state information or command parameters.

20. The apparatus of claim 15, wherein generating the first signature further comprises:
tracking, by the first device, state information associated with data values stored in memory included in the first device;
based on tracking the state information, determining, by the first device, whether a hashed digest to be signed is generated by the first device; and
in response to determining that the hashed digest is generated by the first device, signing, by the first device, the hashed digest using one of the parent private key or the child private key.

21. The apparatus of claim 15, wherein the instructions are configured to cause the processor to perform operations further comprising:
receiving, at the first device, a random challenge from the host device in response to sending the child public key and the first signature to the host device;
generating, by the first device, a second signature based on the random challenge using the child private key; and
sending the second signature to the host device.

22. The apparatus of claim 21, wherein at least one of the first signature or the second signature is generated using a hardware cryptographic engine included in the first device.

23. The apparatus of claim 21, wherein generating the second signature comprises using the second cryptographic operation to generate the second signature.

24. The apparatus of claim 15, wherein the certificate corresponding to the parent public key is generated by a certificate authority at a time of manufacture of the first device, the certificate authority being trusted by the host device and the client device.

25. The apparatus of claim 15, wherein the configuration information corresponding to the first device includes information associated with a state of a physical input pin of the first device.

26. The apparatus of claim 15, wherein the configuration information corresponding to the first device includes data generated by a sensor that is coupled to the first device.

27. The apparatus of claim 26, wherein the sensor is selected from the group consisting of a temperature sensor, a pressure sensor and a voltage sensor.

* * * * *

UNITED STATES PATENT AND TRADEMARK OFFICE
CERTIFICATE OF CORRECTION

PATENT NO.       : 9,323,950 B2
APPLICATION NO.  : 13/553388
DATED            : April 26, 2016
INVENTOR(S)      : Kerry David Maletsky et al.

Page 1 of 1

It is certified that error appears in the above-identified patent and that said Letters Patent is hereby corrected as shown below:

In the Claims
Column 20, line 15-16; In Claim 15, after "and" delete "configured for".

Signed and Sealed this
Fifth Day of July, 2016

Michelle K. Lee
*Director of the United States Patent and Trademark Office*